United States Patent [19]

Pattein et al.

[11] Patent Number: 4,859,742
[45] Date of Patent: Aug. 22, 1989

[54] RADIATION-CROSSLINKABLE THERMOPLASTIC SOLID COMPOSITION AND CURABLE PRODUCTS OBTAINED WITH THIS COMPOSITION

[75] Inventors: Jacky Pattein, Bergerac; Patrice Le Roy, Itteville, both of France

[73] Assignee: Societe Nationale des Poudres et Explosifs, Paris, France

[21] Appl. No.: 134,143

[22] Filed: Dec. 17, 1987

[30] Foreign Application Priority Data

Dec. 19, 1986 [FR] France ................... 86 17788

[51] Int. Cl.$^4$ ................................................. C08F 8/00
[52] U.S. Cl. ..................... 525/131; 522/135; 522/137; 525/440; 525/445; 525/455
[58] Field of Search .............. 525/445, 455, 440, 131; 522/135, 137

[56] References Cited

U.S. PATENT DOCUMENTS 3,658,669  4/1972  Colomb, Jr. et al. ............. 522/137
3,833,384  9/1974  Noonan et al. .................... 522/137
4,284,732  8/1981  Petersen et al. ................... 525/445
4,379,039  4/1983  Fujimoto et al. .................. 522/135

FOREIGN PATENT DOCUMENTS 0197682  10/1986  European Pat. Off. .

Primary Examiner—Melvyn I. Marquis
Attorney, Agent, or Firm—Burns, Doane, Swecker & Mathis

[57] ABSTRACT

The invention relates to a thermoplastic solid composition which can be cured by the application of a radiation, for example UV, and to solid products which can be handled and stored and are obtained by shaping such a composition, before application of the radiation.

The solid thermoplastic composition comprises at least one solid thermoplastic polymer and a radiation-crosslinkable oligomer containing at least two ethylenic unsaturations, each of these unsaturations being situated either at the end of a chain or in a pendent position. The weight ratio of the solid thermoplastic polymer to the radiation-crosslinkable oligomer is between 55/45 and 964, preferably between 70/30 and 96/4, respectively.

The products obtained after crosslinking by the application of radiation have good mechanical properties, even at elevated temperature.

The compositions of the invention can be used particularly for producing packaging sheets having the shape of the product to be wrapped, and of prosthetic components.

16 Claims, No Drawings

RADIATION-CROSSLINKABLE THERMOPLASTIC SOLID COMPOSITION AND CURABLE PRODUCTS OBTAINED WITH THIS COMPOSITION

The invention relates to a solid composition of thermoplastic resins which compositions can be cured by the application of a radiation, and to products obtained by shaping the composition before the radiation is applied.

The invention more particularly relates to a solid composition comprising a solid thermoplastic polymer and a radiation-crosslinkable oligomer, this solid composition being in the form of a product which can be handled and stored before being cured by the application of a radiation.

There are known compositions of thermoplastic resins to which a plasticizer is added particularly in order to lower the softening, and hence moulding, temperature. However, the addition of a plasticizer has the major disadvantage of affecting the final mechanical properties of the product obtained by using these compositions, and more particularly the mechanical properties at elevated temperature.

To improve these mechanical properties, it has been proposed to add a crosslinking agent to the compositions of thermoplastic resins, this agent producing a network with the chains of the thermoplastic polymers. However, compositions of this type generally have a softening temperature which is relatively high, for example higher than 100° C., before crosslinking.

Furthermore, the known compositions are generally crosslinked or cured by a heat treatment which requires a high energy consumption and a relatively long manufacturing cycle.

To do away with this heat treatment, radiation-crosslinkable thermoplastic resins or polymers have been proposed. These resins are generally liquid and pasty and have no mechanical strength at ambient temperature, and this requires special storage conditions and fabrication by casting, with the cure having to be produced before demoulding, by the application of a radiation.

The particular objective of the present invention is to overcome these disadvantages by proposing a solid composition comprising at least one solid thermoplastic polymer which is completely worked up (containing no unsaturation) and a radiation-crosslinkable oligomer. This composition, solid at ambient temperature, has a relatively low softening temperature, of below 120° C., permitting easy fabrication. Furthermore, the products obtained by fabricating this composition can be handled, can be shaped, particularly by deformation, and can be easily stored before the curing of the composition, which is produced by exposing the product to a radiation.

To this end, the invention proposes a radiation-crosslinkable thermoplastic solid composition comprising essentially at least one solid thermoplastic polymer and a radiation-crosslinkable oligomer containing at least two ethylenic unsaturations, each of these unsaturations being situated either at the end of a chain or in a pendent position.

The weight ratio of the solid thermoplastic polymer(s) to the radiation-crosslinkable oligomer is between 55/45 and 96/4, preferably between 70/30 and 96/4, respectively.

According to one characteristic of the invention, the ethylenic unsaturations of the radiation-crosslinkable oligomer are of the acrylic, methacrylic, allylic or vinyl type. Preferably, it is the unsaturations of the acrylic type which are the most reactive and the most sensitive to radiation, particularly to UV radiation.

According to another characteristic of the invention, the composition can be cured by exposure to a radiation at a temperature below or equal to the softening temperature of the latter, and preferably below. Thus, these solid compositions can be cured by exposure to a radiation, at ambient temperature, with the efficiency of crosslinking of the oligomer increasing with the increase in the temperature at which the exposure to the radiation is performed.

According to a further characteristic of the invention, the temperature of exposure to the radiations is higher than the glass transition temperature (Tg) of the composition.

This glass transition temperature of the composition is close to that of the thermoplastic polymer employed, or if the thermoplastic polymer to which a plasticizer has been added.

The composition according to the invention is solid at ambient temperature and can be produced in the form of a compact block or of a solid sheet, which can be handled and stored. Furthermore, a compact block of the composition of the invention can be cut into sheets, or can be ground up into granules, for example, without this giving rise to curing of the composition by crosslinking of the oligomer.

The conversion of the solid composition into a desired shape permitting easy fabrication may be carried out by mechanical processes by starting with the solid composition itself or with a solution thereof.

Thus, the granules obtained may be converted into a sheet, plaque, rod, reed, tube or bar by various processes such as extrusion, pultrusion, calendering and injection or compression moulding, for example. Impregnation of fibres, cloths or mats, for example, either with a solution of this composition in a solvent, or with the molten composition, can also be carried out with the composition of the invention, before it is cured.

The products thus obtained are solid and can be stored and handled at ambient temperature without any special precaution. Furthermore, these products are not wholly developed, since the composition is not cured. Thus, it is possible to form them to the desired shape by deformation, and particularly by thermoforming, the shape of the product produced in this manner being fixed by exposure to a radiation causing the crosslinking of the oligomer.

The products obtained after crosslinking have good mechanical properties, even at elevated temperature.

In the present invention, the term "oligomer" denotes both a monomer and an oligomer or a prepolymer which may comprise up to several tens of repeat units or a mixture of these products.

According to a characteristic of the invention, the abovementioned oligomer has a molecular weight of between approximately 400 and 6,000, preferably between 400 and 4,500.

In a preferred embodiment of the invention, the oligomer contains at least two acrylic groups, and preferably two or three acrylic groups.

The oligomer may be aliphatic, aromatic, arylaliphatic or alkylaromatic.

In a preferred form of embodiment of the invention, the oligomers are polyurethanes obtained from a polyisocyanate which has been reacted with a hydroxyacrylate or hydroxy-methacrylate compound, for example.

Advantageously, the hydroxy-acrylate compound is hydroxyethyl acrylate.

The polyisocyanate may be either an aromatic polyisocyanate or an aliphatic polyisocyanate.

The polyisocyanate is preferably obtained by reaction of a diisocyanate with a polyol, advantageously with a diol, in order to produce a difunctional oligomer.

As polyols which are particularly suitable for the invention, there may be mentioned polyetherpolyols, polyesterpolyols, polyetherpolyesterpolyols, polycaprolactones, polytetrahydrofuran, polycarbonatepolyols, hydroxylated polybutadienes, and mixtures of these compounds.

The oligomers may also be obtained by reaction of an acid containing ethylenic unsaturation at the end of a chain with a polyol or a polyepoxide.

The preferred acids of the invention are, in particular, acrylic acid and methacrylic acid.

Suitable polyols which may be mentioned by way of example are polyetherpolyols, polyesterpolyols, polyetherpolyesterpolyols, polycaprolactones, polytetrahydrofurans, polycarbonatepolyols, hydroxylated polybutadienes and polyurethanes containing hydroxyl end groups, and mixtures of these compounds.

As suitable polyepoxide compounds there may be mentioned by way of example the compounds obtained from the glycidyl ether of bisphenol A or of its higher homologues.

The two abovementioned processes are the preferred processes of the invention. However, any compound containing at least two ethylenic unsaturations which are reactive under the action of a radiation, each of these unsaturations being situated either at the end of a chain or in a pendent position, is suitable for the invention, provided that it is compatible with the associated thermoplastic polymer.

An oligomer will be said to be compatible with a thermoplastic polymer if it mixes with the polymer and if the oligomer does not sweat out of the mixture when the composition is being fabricated, particularly during extrusion or calendering, for example, or during the storage of the uncrosslinked product.

These compounds may be obtained using suitable known processes.

According to another characteristic of the invention, the solid thermoplastic polymer(s) has (have) a molecular weight of between approximately 10,000 and 200,000, preferably between 40,000 and 150,000.

This polymer is preferably a solid thermoplastic polyurethane obtained using at least one polyol with at least one polyisocyanate in the presence of a short diol chain extender.

Suitable polyols which may be mentioned by way of example are polyetherpolyols, polyesterpolyols, polyetherpolyesterpolyols, polycarbonatepolyols, polytetrahydrofuran, polycaprolactones, hydroxylated polybutadienes and mixtures of these compounds.

This solid thermoplastic polyurethane is optionally employed mixed with a plasticizer.

As short diol chain extenders which are suitable there may be mentioned by way of example 1,4-butanediol, 1,3-butanediol, propanediol and cyclohexanedimethanol.

As suitable polyisocyanates there may be employed, by way of example, any isocyanate whose reaction with one of the polyols listed above leads to a solid thermoplastic polymer.

Other thermoplastic polymers can be employed, such as, for example, polyvinyl chloride or polyvinyl butyrate, optionally mixed with a plasticizer.

According to a preferred alternative form of the invention, the solid thermoplastic polymer is a aliphatic polyurethane and the radiation-crosslinkable oligomer is an acrylic or methacrylic, preferably acrylic, aliphatic oligomer.

In a preferred version of embodiment of the invention, and especially in order to obtain better compatibility between the radiation-crosslinkable oligomer and the solid thermoplastic polymer, both these products are polyurethanes obtained using either the same polyol or the same polyisocyanate.

According to another characteristic of the invention, the composition comprises a photoinitiator to permit crosslinking of the oligomer by means of exposure to UV radiations.

The compositions of the invention may also comprise additives which are usually employed in plastic materials, such as, for example, reinforcing fillers, fillers which modify the thermal or electrical conductivity of the material, colorants, pigments, adhesion promoters or stabilizers.

However, these additives must not constitute screening against the radiations, this condition being especially important when a UV radiation is employed.

Electromagnetic radiations, an electron bombardment system or photoelectric radiations may be employed, for example, as radiation. The preferred radiation of the invention is UV radiation.

The compositions of the invention can be used to produce diverse objects, and more particularly packaging sheets formed in the shape of the product to be wrapped, and prosthetic components, for example.

The following examples, which are given solely by way of indication illustrate the invention more clearly and show other details and advantages of the invention.

EXAMPLE 1

A composition according to the invention is prepared by mixing a thermoplastic polyurethane polymer of molecular mass 125,000 with an acrylic oligomer of molecular mass 1,300, in the presence of a solvent (tetrahydrofuran). The solution obtained has a solids content of 20%.

The thermoplastic polyurethane is obtained by reacting a diisocyanate, dicyclohexylmethylene diisocyanate, with a polyol, a caprolactone of mass 1,000, in the presence of a chain extender, 1,4-butanediol. In order to obtain a molecular mass of 125,000, an isocyanate group/hydroxyl group ratio (NCO/OH) ratio close to 1.01 is employed.

The acrylic oligomer is obtained by reacting dicyclohexylmethylene diisocyanate with a polyesterdiol of molecular mass 600, followed by reaction of hydroxyethyl acrylate with the compound containing isocyanate end groups, obtained in this manner.

A photoinitiator 2,2-dimethoxy 2-phenyl acetophenone, known as Irgacure 651 (trade name used by Ciba-Geigy) is added to the solution. The composition has the following formula (the proportions being expressed in parts by weight):

| | 70 parts |
|---|---|
| thermoplastic polyurethane (Tg = −30° C.) | 70 parts |
| acrylic oligomer | 30 parts |
| photoinitiator | 2 parts |

| Composition | Irradiation Temperature | Time | Degree of conversion of the unsaturations | Insoluble in $CH_2Cl_2$ | $t_m$ before irradiation | Temperature behaviour |
|---|---|---|---|---|---|---|
| Example 2 | 25° C. | 0,50s | 90–100% | 82% | 85° C. | >160° (2) |
| Example 2 bis | 85° C. (*) | 0,50s | 100% | 100% | 85° C. | >160° (2) |

(2) no flow but sudden release of one plate of glass
(*) moulding temperature.

The solvent is evaporated off, and a dry, handlable but deformable film is thus obtained.

The softening temperature of the film is determined by sandwiching it between two plates of glass to which a pressure of the order of 1 MPa is applied. The temperature ($t_m$), also known as the moulding temperature, being that at which the film changes in appearance, particularly by becoming transparent.

The temperature behaviour of the film is also determined, still using the same assembly, by measuring the temperature at which film flow takes place, enabling the plates of glass to move.

The degree of conversion of the ethylenic unsaturations is determined by infrared analysis of the composition.

Furthermore, the crosslinking of the oligomer is also demonstrated by a solubility test on the composition and measurement of the proportion of insolubles obtained, after extraction with methylene chloride under reflux.

Thus, in the case of the composition of this Example 1, the following results were noted:

Furthermore, the mixing of the materials is carried out in a molten state and not in a solvent medium.

A block is thus obtained, from which a sheet can be cut out.

Infrared analysis was also used to demonstrate the fact that, before irradiation, substantially none of the acrylic groups in the acrylic oligomer had been destroyed or had reacted with another chemical species.

EXAMPLE 3

A polycaprolactone of mass 1,000, a dicyclohexyl methylene diisocyanate, an acrylic oligomer of mass 1,300 (identical with that employed in Examples 1 and 2), a chain extender, 1,4-butanediol and a photoinitiator (Irgacure 651) are mixed in a reactor.

The mixture is cast in a mould and then the assembly is heated to 125° C. for 20 hours.

During this heat treatment, the thermoplastic polyurethane is developed without the acrylic oligomer taking part in the reaction.

An infrared analysis shows, in fact, that all the acrylic groups added are still present after the mixture has been heated.

The quantities of material which are added initially are calculated to produce the following final composition:

| Composition | Irradiation Temperature | Time | Degree of conversion of the unsaturations | Insoluble in $CH_2Cl_2$ | $t_m$ before irradiation | Temperature behaviour |
|---|---|---|---|---|---|---|
| Thermoplastic polyurethane alone M: 125000 | without irradiation | | 0% | 0% | 120–130° C. | 140°–150° C. (1) |
| Composition of Example 1 | without irradiation | | 0% | 0% | 75° C. | 110–120° C. (1) |
| | 20° C. | 0.5s | 90 to 100% | 80% | — | 140° C. (2) |

(1) flow
(2) no flow, but sudden release of one plate of glass.

The irradiation was produced by exposure to a UV lamp with a power of 80 W/cm.

EXAMPLE 2 AND 2 BIS

The starting materials are identical, but the mixture contains 18 parts by weight of acrylic oligomer per 100 parts of thermoplastic polyurethane.

| | |
|---|---|
| thermoplastic polyurethane of M: 100,000 (Tg ≈ −30° C.) | 100 parts |
| acrylic oligomer M: 1,300 g | 9 parts |
| photoinitiator | 5 parts |

The quantity of diisocyanate and of the chain extender is calculated to give a NCO/OH ratio≃1.01 and a molecular mass of the thermoplastic polyurethane of about 100,000.

After curing and cooling, a solid block is obtained which can be either cut into sheets or ground up into granules.

The granules obtained in this example are then converted by extrusion to form a tape 10 cm in width and 1 mm in thickness.

Infrared anaylsis has also been used to demonstrate that only a small part of the acrylic groups is consumed during the extrusion.

In the table which follows, the properties of the product thus obtained are collated, firstly before exposure to the UV radiations and, secondly, after irradiation.

| Composition of Example 3 | Irradiation Temperature | Time | Degree of conversion of the unsaturations | Insoluble in $CH_2Cl_2$ | $t_m$ before irradiation | Temperature behaviour |
|---|---|---|---|---|---|---|
| After curing and cooling | without irradiation | | 0% | 0% | 100–120° C. | 120° C. 130° C. (1) |
| After extrusion | without irradiation | | 20% | 0% | 90–100° C. | 120–130° C. (1) |
| | 25° C. | 0.5s | 90 to 100% | 100% | — | >160° C. (2) |

(1), (2), see Example 1

The tensile mechanical characteristic properties of the product after irradiation are measured at 23° C. and 450 mm/min (rate of application of the pull):
stress at 100% elongation: 5.9 MPa
stress at break: 22 MPa
elongation at break: 300%

In this example, the measurements were carried out on the tape obtained after extrusion and irradiation for 0.5 s at 25° C. However, this tape is a product which can be shaped, particularly by thermoforming, to a desired configuration, before the exposure to the UV radiations.

EXAMPLE 4

Using the same procedure as in Example 3, a composition is manufactured which contains the polyurethane of Example 3 as thermoplastic polyurethane and an acrylic urethane of molecular mass 440, obtained by reacting tetramethylene diisocyanate with hydroxyethyl acrylate, as acrylic oligomer.

The formulation of the composition is the following:

| | |
|---|---|
| thermoplastic polyurethane (M = 100,000 Tg = −30° C.) | 89 parts |
| acrylic oligomer | 11 parts |
| photoinitiator (Irgacure 651) | 2 parts. |

The block obtained after curing is extruded into a sheet with a thickness of approximately 1 mm.

The properties of the product thus obtained, before and after irradiation, are shown in the table below:

| Composition of Example 4 | Irradiation Temperature | Time | Degree of conversion of the unsaturations | Insoluble in $CH_2Cl_2$ | $t_m$ before irradiation | Temperature behaviour |
|---|---|---|---|---|---|---|
| After curing and cooling | without irradiation | | 0% | 0% | 100–110° C. | 120 to 130° C. (1) |
| After extrusion | without irradiation | | 10 to 20% | 0% | 100° C. | 120° C. to 130° C. (1) |
| | 20° C. | 0.5 s | 95% | 80% | — | 150° C. (2) |
| | 90° C. | 0.5 s | 100% | 100% | | 160° C. (2) |

EXAMPLE 5

The same materials and the same process as in Example 4 are employed. The formulation of the composition is the following:

| | |
|---|---|
| thermoplastic polyurethane (M = 100,000 Tg = −30° C.) | 95 parts |
| acrylic oligomer (M: 440) | 5 parts |
| photoinitiator | 1 part |

The block obtained after curing for 20 hours at 125° C. is ground up and then extruded into tape 10 cm in width and 1 mm in thickness.

The properties of the composition are indicated in the following table:

| Composition of Example 5 | Irradiation Temperature | Time | Degree of conversion of the unsaturations | Insoluble in $CH_2Cl_2$ | $t_m$ before irradiation | Temperature behaviour |
|---|---|---|---|---|---|---|
| After curing and cooling | without irradiation | | 0% | 0% | 120° C. | 130° C. (1) |
| After extrusion | without irradiation | | ≈10% | 0% | 100 to 110° C. | 130° C. (2) |
| | 20° C. | 0.5 s | 80% | 20% | — | 150° C. (2) |
| | 100° C. | 0.5 s | 100% | 40% | — | 160° C. (2) |

(1), (2), see Example 1

The tensile mechanical properties of the composition, before and after irradiation, appear in the following table, in comparison with those of the solid thermoplastic polyurethane of mass 100,000, employed in this example. They have been measured on film, at a pull rate of 450 mm/min, at three different temperatures (+20° C., +60° C. and +80° C.).

| Temperature of measurements | 20° C. | | | 60° C. | | | 80° C. | | |
|---|---|---|---|---|---|---|---|---|---|
| Mechanical properties | $\sigma 100\%$ | $\sigma_b$ | $E_b\%$ | $\sigma 100\%$ | $\sigma_b$ | $E_b\%$ | $\sigma 100\%$ | $\sigma_b$ | $E_b\%$ |
| Materials tested | | | | | | | | | |
| Thermoplastic polyurethane of mass 100,000 employed in ex. 5 | 7 | 22 | 520 | 4.1 | 3 | 720 | 0.9 | 1 when $E_b = 10^3\%$ | $>10^3$ |
| Composition of Example 5 without irradiation | 4.0 | 23 | 550 | 2.3 | 4 | 600 | 1.2 | 1,3 when $E_b = 10^3\%$ | $>10^3$ |
| Composition of Example 5 irradiated 0.5 s at 20° C. | 4.5 | 25 | 430 | 2.4 | 6 | 500 | 1.7 | 2.6 | 480 |
| Composition of Example 5 irradiated 0.5 s at 100° C. | 4.9 | 26 | 380 | 2.15 | 8 | 520 | 1.9 | 4 | 420 |

$\sigma 100\%$: stress at 100% elongation (in MPa)
$\sigma_b$: stress at break (in MPa)
$E_b\%$: elongation at break.

It is found that, after irradiation, the film has better mechanical properties with temperature, while retaining its suppleness.

EXAMPLE 6

A composition is prepared according to the operating procedure of Example 1.

The thermoplastic polymer is a polymer of molecular mass 20,000. It is obtained as in Example 1, but with an NCO/OH ratio = 0.90.

The acrylic oligomer is the oligomer employed in Example 4, of molecular mass 440.

The solution in tetrahydrofuran has a solids content of 15%.

The formulation of the composition is the following:

| | |
|---|---|
| thermoplastic polyurethane (M = 20,000 Tg = −20° C.) | 95 parts |
| acrylic urethane oligomer (M = 440) | 5 parts |
| photoinitiator (Irgacure 651) | 1 part. |

After evaporation of the solvent, a dry film is obtained which has the properties shown in the following table.

| Composition | Irradiation Temperature | Time | Degree of conversion of the unsaturations | Insoluble in $CH_2Cl_2$ | $t_m$ before irradiation | Temperature behaviour |
|---|---|---|---|---|---|---|
| thermoplastic polymer alone M: 20000 | without irradiation | | — | 0% | 80–90° C. | 110° C. (1) |
| Composition of Example 6 | without irradiation | | 0% | 0% | 80–90° C. | 110° C. (1) |
| | 20° C. | 0.5s | 90% | 37% | — | ≧140° C. |

| Composition | Irradiation Temperature | Time | Degree of conversion of the unsaturations | Insoluble in $CH_2Cl_2$ | $t_m$ before irradiation | Temperature behaviour (2) |
|---|---|---|---|---|---|---|

(1), (2), see Example 1

The results obtained show the considerable effect of the invention on the temperature behaviour of the composition, after irradiation, while the moulding temperature is maintained or lowered relative to that of the thermoplastic polymer.

EXAMPLE 7

A composition is prepared according to the operating procedure of Example 1, with the same thermoplastic polymer but using, as an acrylic oligomer, an oligomer of molecular mass 4,500, obtained by reacting tetramethylene diisocyanate with a polyesterdiol of molecular mass 2,800 in the presence of hydroxyethyl acrylate.

The formulation of the composition is the following:

| | |
|---|---|
| thermoplastic polymer (M = 120,000 Tg = −30° C.) | 55 parts |
| acrylic oligomer M = 4,500 | 45 parts |
| photoinitiator (Irgacure 651) | 2 parts. |

The properties of the dry film obtained are listed in the following table:

| Composition of Example 7 | Irradiation Temperature | Time | Degree of conversion of the unsaturations | Insoluble in $CH_2Cl_2$ | $t_m$ before irradiation | Temperature behaviour |
|---|---|---|---|---|---|---|
| After drying of the film | without irradiation | | 0% | 0% | 60–70° C. | 100° C. (1) |
| | 25° C. | 0.5 s | 80% | 72% | — | 140° C. to 150° C. (2) |
| | 70° C. | 0.5 s | 100% | 100% | — | 150° C. (2) |

(1), (2), see Example 1

EXAMPLE 8

A composition is prepared according to the operating procedure of Example 3, using the same thermoplastic polymer, but with tripropylene gylcol diacrylate (TPGDA), which contains no urethane group, as acrylic oligomer.

The formulation of the composition is the following:

| | |
|---|---|
| thermoplastic polymer (M = 100,000 Tg = −30° C.) | 94 parts |
| tripropylene glycol diacrylate | 6 parts |
| photoinitiator (Irgacure 651) | 1 part. |

The properties of the composition obtained are the following:

| Composition of Example 8 | Irradiation Temperature | Time | Degree of conversion of the unsaturations | Insoluble in $CH_2Cl_2$ | $t_m$ before irradiation | Temperature behaviour |
|---|---|---|---|---|---|---|
| After curing and cooling | without irradiation | | 0% | 0% | 90– to 100° C. | 120° C. (1) 110° C. |
| After extrusion | without irradiation | | 10% | 0% | 90– to 100° C. | to 120° C. (1) |
| | 25° C. | 0.5 s | 80–90% | 55% | — | >150° C. (2) |
| | 90° C. to 100° C. | 0.5 s | 100% | 67% | — | >150° C. (2) |

(1), (2), see Example 1

EXAMPLE 9

A composition is prepared according to the operating procedure of Example 1, using the same urethane acrylic oligomer and the same photoinitiator, but with the use of polyvinyl chloride (PVC) containing a food-contact grade plasticizer as solid thermoplastic polymer (PVC bottle).

The formulation of the composition is the following:

| | |
|---|---|
| PVC | 90 parts |
| urethane acrylic oligomer | 10 parts |
| photoinitiator (Irgacure 651) | 2 parts. |

The following results were obtained:

| Composition | Irradiation Temperature | Time | $t_m$ before irradiation | Temperature behaviour |
|---|---|---|---|---|
| PVC alone (Tg ≃ +65° C. | without irradiaton | | ≃65° C. | ≃90° C. (flow) |
| | without irradiation | | ≃35° C. | ≃70–80° C. (flow) |
| Composition of Example 9 (Tg ≃ +15° C.) | 20° C. | 0.5 s | — | ≃130° C. (flow, browning, decomposition) |

We claim:
1. A radiation-crosslinkable thermoplastic solid composition comprising at least one solid thermoplastic urethane polymer containing no unsaturation and having a molecular weight between 10,000 and 200,000, and a radiation-crosslinkable oligomer containing at least two ethylenic unsaturations selected from the group consisting of acrylic unsaturations, methacrylic unsaturations, vinylic unsaturations and allylic unsaturations, each of these unsaturations being situated either at the end of a chain or in a pendant position, wherein the weight ratio of the solid thermoplastic polymer to the radiation-crosslinkable oligomer is between 55/45 and 96/4.

2. The composition of claim 1 wherein the radiation-crosslinking temperature of the composition is between the glass transition temperature (Tg) and the softening temperature of the composition.

3. The composition of claim 1 wherein the radiation-crosslinkable oligomer has a molecular weight of between 400 and 6,000.

4. Composition according to claim 1 wherein the radiation-crosslinkable oligomer contains at least two acrylic groups.

5. The composition of claim 1 wherein the solid thermoplastic polymer has a molecular weight of between 40,000 and 150,000.

6. Composition according to claim 1, wherein the solid thermoplastic polymer is employed mixed with a plasticizer.

7. The composition of claim 1 wherein the solid thermoplastic polymer is obtained in the presence of a short diol chain extender by reaction of a polyisocyanate with at least one polyol chosen from the group consisting of polyetherpolyols, polyesterpolyols, polyetherpolyesterpolyols, polycaprolactones, polytetrahydrofurans, polycarbonatepolyols and hydroxylated polybutadienes.

8. Composition according to claim 1, wherein the radiation-crosslinkable oligomer is a polyurethane.

9. The composition of claim 8 wherein the radiation-crosslinkable oligomer is obtained by fixing ethylenic unsaturations, either at the end of a chain or in a pendant position, onto a compound containing urethane functions.

10. The composition of claim 9 wherein the compound containing urethane functions is obtained by reaction of a diisocyanate with at least one polyol chosen from the group consisting of polyetherpolyols, polyesterpolyols, polyetherpolyesterpolyols, polycaprolactones, polytetrahydrofurans, polycarbonatepolyols and hydroxylated polybutadienes.

11. Composition according to claim 1, wherein the solid thermoplastic polymer and the radiation-crosslinkable oligomer are polyurethanes obtained from either the same polyisocyanate or the same polyol.

12. The composition of claim 1 wherein the solid thermoplastic urethane polymer is an aliphatic polyurethane and the radiation-crosslinkable oligomer is an acrylic aliphatic oligomer.

13. A solid product curable by radiation-crosslinking, produced by shaping, impregnating, or evaporating a solution of the composition of claim 1.

14. The solid product of claim 13 wherein said product is produced by shaping the composition of claim 1 to form a product having a shape selected from the group consisting of compact blocks, sheets, granules, plaques, rods, reeds, tubes and bars.

15. The radiation-crosslinkable thermoplastic solid composition of claim 1 wherein the weight ratio of the solid thermoplastic polymer to the radiation-crosslinkable oligomer is between 70/30 and 96/4.

16. The composition of claim 3 wherein the radiation-crosslinkable oligomer has a molecular weight between 400 and 4,500.

* * * * *